US008872672B2

(12) United States Patent
Whang et al.

(10) Patent No.: US 8,872,672 B2
(45) Date of Patent: Oct. 28, 2014

(54) TRAFFIC SIGNAL SYSTEM WITH DUAL LIGHT SOURCES

(75) Inventors: Allen Jong-Woei Whang, Taipei (TW);
Yi-Yung Chen, Taipei (TW);
Horng-Ching Hsiao, Taipei (TW);
Jiun-Shi Liu, Taipei (TW); Nai-Lun Ku, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 328 days.

(21) Appl. No.: 13/489,700

(22) Filed: Jun. 6, 2012

(65) Prior Publication Data

US 2013/0027223 A1  Jan. 31, 2013

(30) Foreign Application Priority Data

Jul. 28, 2011  (TW) .............................. 100126811 A

(51) Int. Cl.
*G08G 1/095* (2006.01)
*H05B 37/02* (2006.01)

(52) U.S. Cl.
CPC ................. *G08G 1/095* (2013.01); *Y02B 20/46* (2013.01); *Y02B 20/72* (2013.01); *H05B 37/0218* (2013.01)
USPC ................. 340/907; 359/1; 250/200; 348/68; 362/317; 116/63 R

(58) Field of Classification Search
USPC ................. 340/907, 916; 362/317, 326, 331; 385/147; 250/200; 359/1, 15, 17; 252/299.01; 116/63 R; 348/68, 70
See application file for complete search history.

(56) References Cited

U.S. PATENT DOCUMENTS

| 6,054,932 | A | * | 4/2000 | Gartner et al. | ........... 340/815.65 |
|---|---|---|---|---|---|
| 6,072,407 | A | * | 6/2000 | Shin | .............................. 340/907 |
| 7,808,402 | B1 | * | 10/2010 | Colby | .......................... 340/907 |
| 8,246,207 | B2 | * | 8/2012 | Chen et al. | .................... 362/253 |
| 8,415,886 | B2 | * | 4/2013 | Tsou | .............................. 315/149 |
| 2002/0027510 | A1 | * | 3/2002 | Jones et al. | .................... 340/907 |
| 2005/0122229 | A1 | * | 6/2005 | Stevenson et al. | ........ 340/815.45 |
| 2010/0182164 | A1 | * | 7/2010 | Diba | .............................. 340/907 |
| 2010/0182294 | A1 | * | 7/2010 | Roshan et al. | ................. 345/207 |

* cited by examiner

*Primary Examiner* — George Bugg
*Assistant Examiner* — Edny Labbees
(74) *Attorney, Agent, or Firm* — Bacon & Thomas, PLLC

(57) ABSTRACT

A traffic signal system with dual light sources includes a signal displaying module, an ambient light module and a supplementary light module. The ambient light from environment is assembled by the ambient light module for generating a first light beam. A second light beam is provided by the supplementary light module disposed near the ground for easy maintaining and avoiding danger. The supplementary light module includes a sensor and a control circuit. The sensor senses the brightness of the first light beam passing through the signal displaying module and generates a photosensitive signal. The brightness of the second light beam is regulated by the control circuit according to the photosensitive signal. The brightness of the first light beam is supplied by regulating the brightness of the second light beam, so the signal displaying module has high-brightness light source and achieves the energy conservation.

9 Claims, 3 Drawing Sheets

TRAFFIC SIGNAL SYSTEM WITH DUAL LIGHT SOURCES

BACKGROUND OF THE INVENTION (1) Field of the Invention

The invention relates to a traffic signal system, and especially relates to a traffic signal system with dual light sources by combining an ambient light module with a supplementary light module having a light emitting diode.

(2) Description of the Prior Art

The traffic signal system is an common device, which disposed on the street or road, for indicating the driver and the pedestrian passing across the street or road. The traffic signal system makes the traffic safe and the transportation smooth.

The conversional traffic signal system includes plural signal lights with several colors and a fixed rod. The conversional traffic signal system indicates the driver and the pedestrian passing or stopping by switching the colors of the signal lights. For the driver and the pedestrian clearly seeing the traffic signal, the light source of the signal light is mostly disposed on the top of the fixed rod with a high height. However, because of the high height of the light source, the maintenance worker must board on the truck, which can take the maintenance worker up to the top of the fixed rod, so the maintenance worker can fix the broken signal lights. In the process, the human resource and the maintenance cost are extremely consumed.

Otherwise, the signal lights of the conversional traffic signal system uses the electrical power, and the most electrical power is dissipated by heat so as to consume lots of electrical power. The green energy such as solar energy, renewable energy and etc. is a trend industry, so how to improve the usage of the green energy is an important issue in the field. Moreover, how to provide a traffic signal system effectively using the green energy for achieving the energy conservation and easy maintenance is an urgent issue in the field.

SUMMARY OF THE INVENTION

Accordingly, the object of the invention is to provide a traffic signal system with dual light sources for providing high-brightness light and achieving the energy conservation by combining an ambient light module with a supplementary light module disposed on a position near the ground.

In one aspect, the invention provides a traffic signal system with dual light sources includes a signal displaying module, an ambient light module and a supplementary light module. The signal displaying module emits an traffic signal. The ambient light module captures an ambient light to generate a first light beam, and the first light beam is able to provide the traffic signal with a first brightness. The supplementary light module is disposed on a position near the ground, and includes a light emitting diode (LED), a sensor and a control circuit. The light emitting diode emits a second light beam to the signal displaying module so as to provide the traffic signal with the second brightness. The sensor is electrically connected with the signal displaying module so as to sense the first brightness and generates a photosensitive signal. The control circuit electrically connects the sensor and the LED to regulate a second brightness of the second light beam in accordance with the photosensitive signal.

In an embodiment, the signal displaying module includes a first modulation unit, a second modulation unit, a light mixer, a light switch unit and a display terminal. The first light beam and second light beam are modulated into a first coloured light by the first modulation unit. The first light beam and the second light beam are modulated into a second coloured light by the second modulation unit. The first coloured light and the second coloured light are mixed by the light mixer so as to generate a third coloured light. The signal displaying module receives the first coloured light, the second coloured light and the third coloured light, and controls the passage thereof through the light switch unit, thereby displays the traffic signal on the display terminal.

In an embodiment, the first light beam has a visible light portion and an invisible light portion, and the ambient light module includes a first harvesting unit, a filter, a first light guiding unit and a first coupler. The first harvesting unit is able to harvest the ambient light. The filter is disposed above the first harvesting unit to filter an invisible light portion of the first light beam generated by the ambient light module. The visible light portion is transmitted to the signal displaying module by the first light guiding unit. The first coupler is disposed on the path of the visible light portion between the first harvesting unit and the first light guiding unit, thereby the energy of the visible light portion is compressed by the first coupler.

In an embodiment, the supplementary light module includes a compound parabolic concentrator, a second light guiding unit and a second coupler. The compound parabolic concentrator is disposed on the path of the second light beam for concentrating the second light beam, and has a reflective mask and a lens. The reflective mask is disposed around the light emitting diode and the lens is disposed on the path of the second light beam. The second light beam enters the second light guiding unit via the lens and is transmitted to the signal displaying module by the second light guiding unit. The second coupler is disposed between the lens and the second light guiding unit, and the energy of the second light beam emitted from the lens is compressed by the second coupler.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
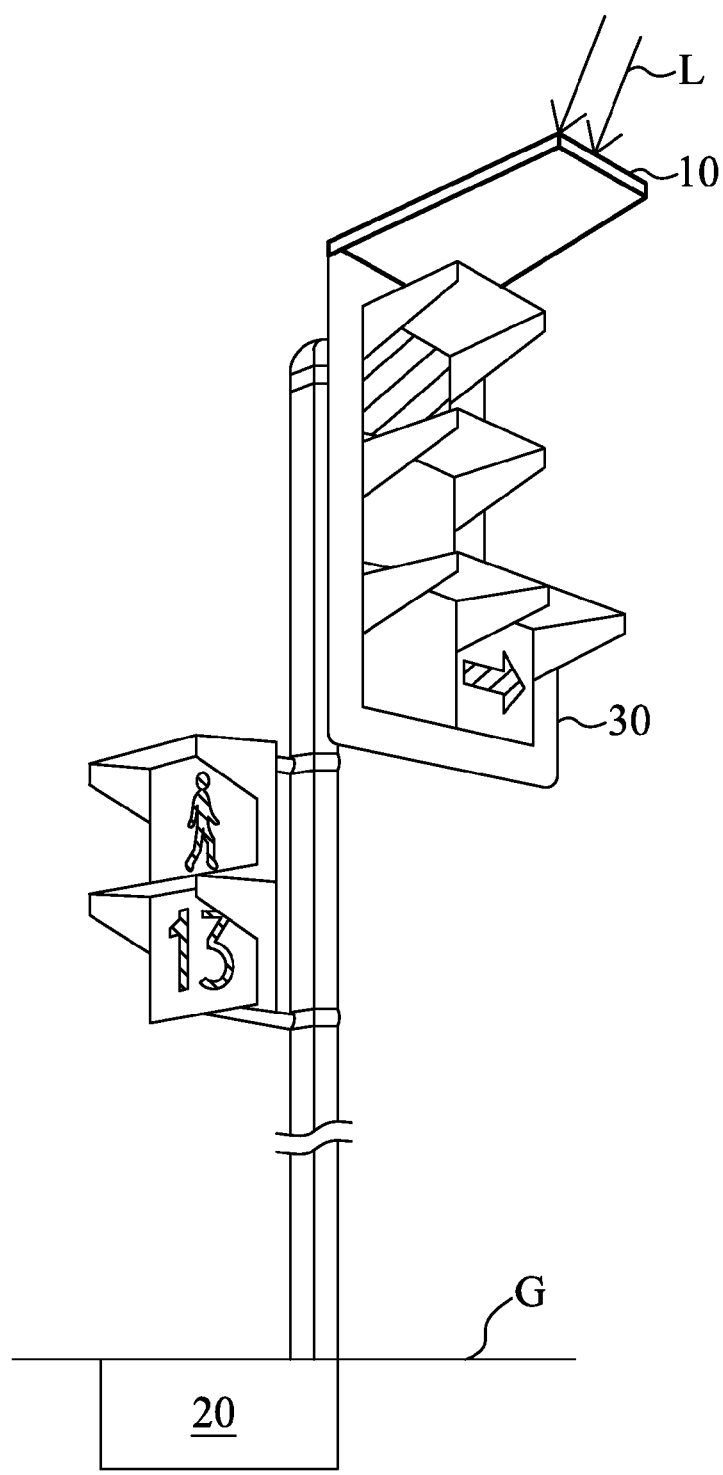
FIG. 1 is a schematic view of the traffic signal system with dual light sources of the invention.

Refer to FIG. 1 for the schematic view of a traffic signal system with dual light sources of the invention. A traffic signal system with dual light sources includes an ambient light module 10, a supplementary light module 20 and a signal displaying module 30. The ambient light module is disposed above the supplementary light module 30 for capturing an ambient light L to generate a first light beam, and provides the first light beam to the signal displaying module 30. The supplementary light module 20 is disposed on a position near the ground G. The signal displaying module 30 emits an traffic signal. The first light beam emitted from the ambient light module 10 is able to provide the traffic signal with a first brightness. The supplementary light module 20 regulates a second brightness of the second light beam according to the first brightness, and the second light beam provides the second brightness to the traffic signal I.

Figure 2:
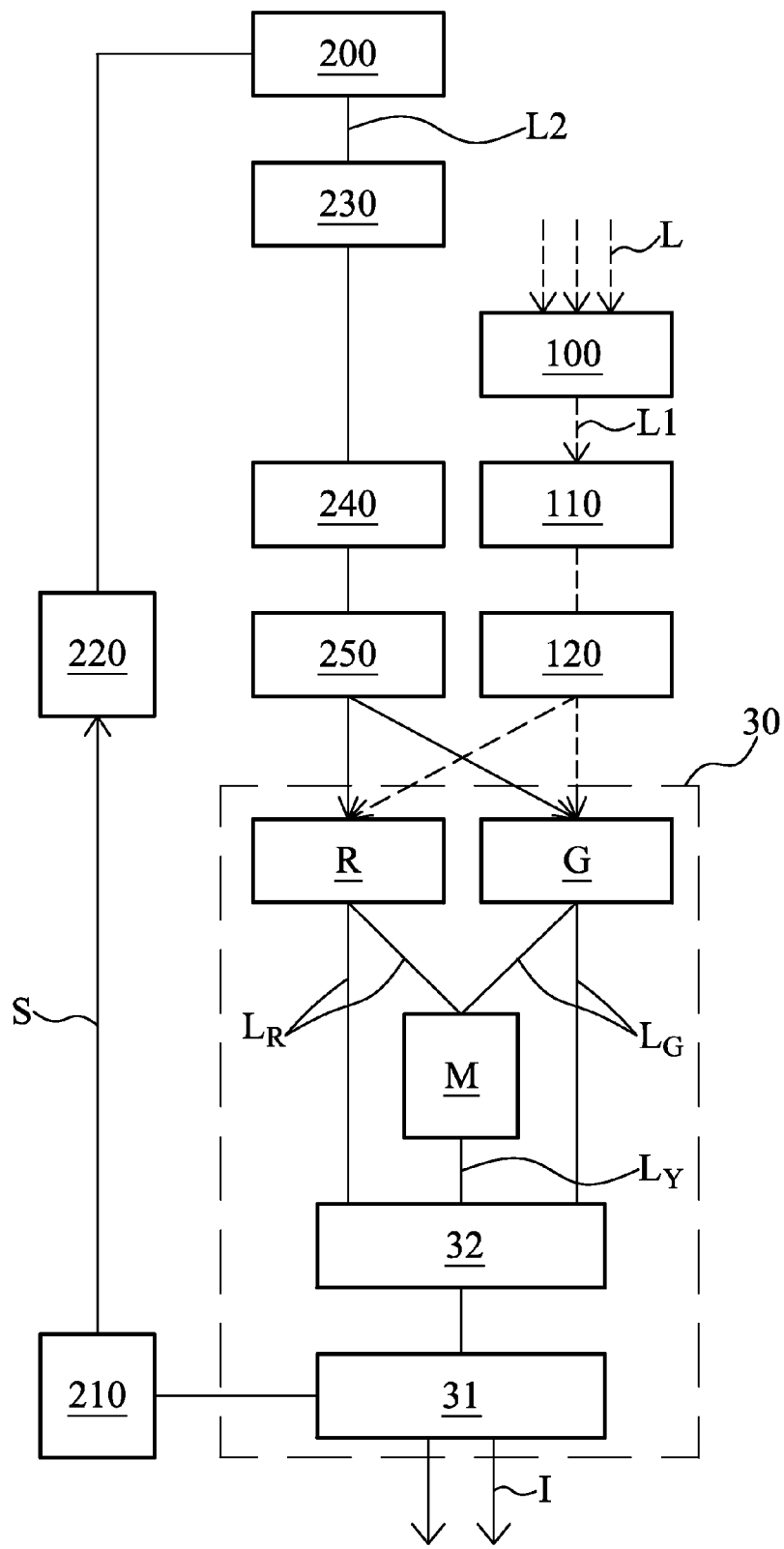
FIG. 2 and FIG. 3 are the block diagrams showing the traffic signal system with dual light sources.

Refer to FIG. 2 for the block diagrams showing the traffic signal system with dual light sources of a first embodiment. The ambient light module 10 includes a first harvesting unit 100, a first coupler 110 and a first light guiding unit 120. The ambient light L from environment is harvested by the first harvesting unit 100 to generate the first light beam L1, and the first harvesting unit 100 includes a Sun-Lego, which has a large light receiving surface for harvesting the ambient light L such as solar light and has the capability of anti-ultraviolet ray and anti-infrared ray. The first light beam L1 has a visible light portion and an invisible light portion. By a filter (without drawn) disposed above the first harvesting unit 100, the invisible light portion is filtered off and the visible light portion is passed through, so the ultraviolet ray of the invisible light portion is removed for avoiding body injury. As well as, the infrared ray of the invisible light portion is eliminated for avoiding heat, which can damage the traffic signal system with dual light sources. The first coupler 110 is disposed on the path of the visible light portion of the first light beam L1 between the first harvesting unit 100 and the first light guiding unit 120, thereby the energy of the visible light portion is compressed by the first coupler to improve the illuminate of the ambient light module 10. The visible light portion of the first light beam L1 is transmitted to the signal displaying module 30 by the first light guiding unit 120 for providing the traffic signal I with the first brightness.

The supplementary light module 20 includes a light emitting diode (LED) 200, a sensor 210, a control circuit 220, a second harvesting unit 230 such as a compound parabolic concentrator, a second coupler 240 and a second light guiding unit 250. The light emitting diode 200 emits the second light beam L2. The sensor 210 is electrically connected with the signal displaying module 30 so as to sense the first brightness of the first light beam L1 and generates a photosensitive signal S. The control circuit 220 electrically connects the sensor 210 and the LED 200 to regulate the second brightness of the second light beam L2 in accordance with the photosensitive signal S, so the second light beam L2 provides the traffic signal I with the second brightness. The second harvesting unit 230 is disposed on the path of the second light beam L2 for concentrating the second light beam L2. The second coupler 240 is disposed on the path of the second light beam L2 emitted from the harvesting unit 230, and the energy of the second light beam L2 is compressed by the second coupler 240. The second light beam L2 enters the second light guiding unit 250 and is transmitted to the signal displaying module 30 by the second light guiding unit 250.

By the disposition of said supplementary light module 20, the insufficient first brightness of the first light beam emitted from the ambient light module 10 is supplied with the second brightness. The sensor 210 of the supplementary light module 20 senses the first brightness of the first light beam L1 and generates the photosensitive signal S for judging the first brightness is sufficient or not. The supplementary light module 20 provides the second light beam as supplementary light. Otherwise, the LED 200 has the capabilities of small volume, multi-sources, the design-able illumination angle. The supplementary light module 20 has the second coupler 240 and the second light guiding unit 250 for effectively transmitting the supplementary light to the signal displaying module 30. As well as, the supplementary light module 20 is disposed near the ground or on the ground, so the human resource and the maintenance cost are effectively saved.

At night, the ambient light L from environment is insufficient, so the first brightness of the first light beam L1 emitted from the ambient light module 10 is smaller than a reference value. Meanwhile, the second brightness of the second light beam L2 emitted from the LED 200 is regulated to rise up by the control circuit 220 according to the photosensitive signal S, so the total brightness of adding the first brightness and the second brightness up is larger than the reference value. The brightness of the traffic signal system with dual light sources is supplied by the second brightness of the second light beam L2. In the daytime, the ambient light L from environment is sufficient. If the first brightness of the first light beam L1 emitted from the ambient light module 10 is larger than the reference value, the second brightness of the second light beam L2 emitted form the LED 200 is regulated to roll back by the control circuit 220 according to the photosensitive signal S, or the LED 200 is turned off to effectively save the energy.

The signal displaying module 30 includes a first modulation unit R, a second modulation unit G, a light mixer M, a display terminal 31 and a light switch unit 32. The first light beam L1 and the second light beam L1 are modulated into a first coloured light $L_R$ by the first modulation unit R. The first light beam L1 and the second light beam L2 are modulated into a second coloured light $L_G$ by the second modulation unit G. The first coloured light $L_R$ and the second coloured light $L_G$ are mixed by the light mixer M so as to generate a third coloured light $L_Y$. The light switch unit 32 receives the first coloured light $L_R$, the second coloured light $L_G$ and the third coloured light $L_Y$ and then passes the first coloured light $L_R$, the second coloured light $L_G$ or the third coloured light $L_Y$ through, so the traffic signal I is displayed on the display terminal 31. In other words, the signal displaying module 30 receives the first coloured light $L_R$, the second coloured light $L_G$ and the third coloured light $L_Y$ and controls the passage thereof through the light switch unit 32, thereby displays the traffic signal I on the display terminal 31

Figure 3:
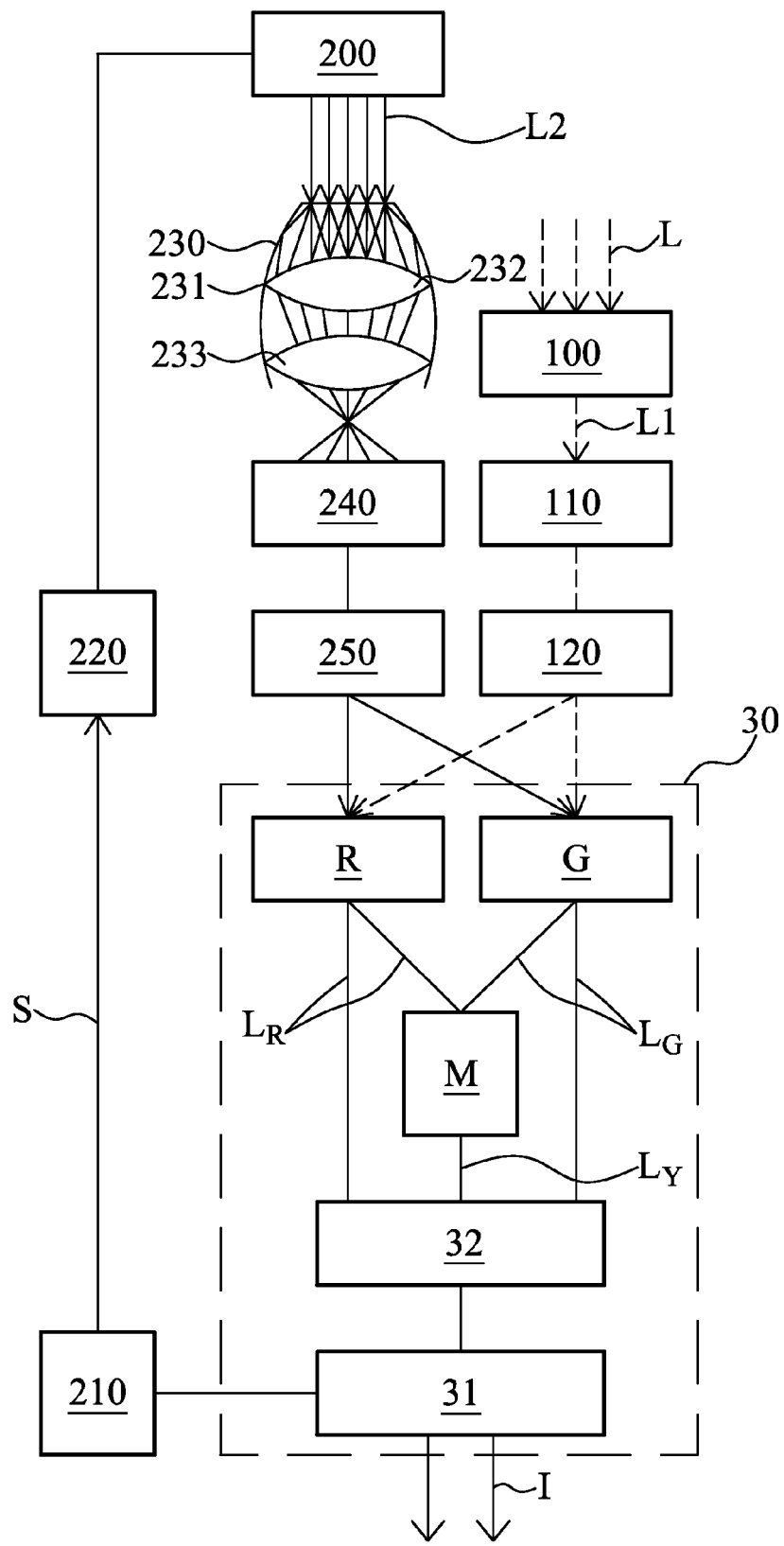

Refer to FIG. 3 for the block diagrams showing the traffic signal system with dual light sources of a second embodiment. A traffic signal system with dual light sources includes an ambient light module 10, a supplementary light module 20 and a signal displaying module 30, wherein the ambient light module 10 is described as said first embodiment thereof.

The second harvesting unit 230 of the supplementary light module 20 in the first embodiment is replaced by a compound parabolic concentrator in the second embodiment. The compound parabolic concentrator 230 has a reflective mask 231 and two lenses 232 and 233. The reflective mask 231 is disposed around the light emitting diode 200 and the lenses 232 and 233 are disposed on the path of the second light beam L2. When the second light beam L2 is emitted from the LED 200, the reflective mask 231 reflects the second light beam L2 with plural directions to the lenses 232 and 233. The second light beam L2 enters the second coupler 240 via the lenses 232 and 233, so the energy of the second light beam L2 is concentrated by the second coupler 240.

The signal displaying module 30 includes a first modulation unit R, a second modulation unit G, a light mixer M, a display terminal 31 and a light switch unit 32. The first modulation unit R is a red sheet and the second modulation unit G is a green sheet, so the first light beam L1 and the second light beam L1 are switched to a red light $L_R$ by the red sheet R and are switched to a green light $L_G$ by the green sheet G. The red light $L_R$ and the green light $L_G$ are mixed by the light mixer M so as to generate a yellow light L. The light switch unit 32 receives the red light $L_R$, the green light $L_G$ and the yellow light $L_Y$ and then passes the red light $L_R$, the green light $L_G$ or the yellow light $L_Y$ through according to a succession arrangement, so the traffic signal I is displayed on the display terminal 31 of the traffic signal system with dual light sources by different coloured lights such as the red light, the green light or the yellow light.

Above all, the traffic signal system with dual light sources of the invention is mainly composed of an ambient light module and a supplementary light module disposed near the ground. The supplementary light module near the ground has the characteristic of easy maintenance and includes the control circuit and the sensor, so the second brightness of the second light beam emitted from the supplementary light module can be regulated according to the first brightness of the first light beam emitted from the ambient light module. The second brightness from the supplementary light module is increased at night; and the second brightness from the supplementary light module is decreased in the daytime so as to save energy. The ambient has the characteristic of filter, so the infrared ray causing heat and the ultraviolet ray injuring body are removed. Otherwise, the disposition of the coupler and the light guiding unit, the first light beam is compressed and transmitted to the signal displaying module for providing high-brightness light to the traffic signal system.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A traffic signal system with dual light source comprising;
    a signal displaying module for emitting an traffic signal;
    an ambient light module for capturing an ambient light to generate a first light to generate a first light beam, and the first light beam provides the traffic signal with a first brightness; and
    a supplementary light module disposed on a position near the ground, and said supplementary light module comprising:
    a light emitting diode providing a second light beam to the signal displaying module so as to provide the traffic signal a second brightness;
    a sensor electrically connected with the signal displaying module so as to sense the first brightness and generate a photosensitive signal; and
    a control circuit electrically connecting to the sensor and the light emitting diode to regular the second brightness of the second light beam in accordance with the photosensitive signal.

2. The traffic signal system of claim 1, wherein the signal displaying module comprises
    a first modulation unit to modulate the first light beam and second light beam into a first coloured light;
    a second modulation unit to modulate the first light beam and second light beam into a second coloured light; and
    a light mixer to mix the first coloured light and the second coloured light and generate a third coloured light.

3. The traffic signal system of claim 2, wherein the signal displaying module comprises a light switch unit and a display terminal, so as to receive the first coloured light, the second coloured light and the third coloured light and control the passage thereof through the light switch unit, thereby display the traffic signal on the display terminal.

4. The traffic signal system of claim 1, wherein the ambient light module comprises
    a first light harvesting unit to harvest the ambient light; and
    a filter disposed above the first harvesting unit to filter an invisible light portion of the first light beam generated by the ambient light module.

5. The traffic signal system of claim 4, wherein the ambient light module comprises a first light guiding unit to transmit a visible light portion of the first light beam to the signal displaying module.

6. The traffic signal system of claim 5, wherein the ambient light module comprises a first coupler disposed on the path of the visible light portion between the first harvesting unit and the first light guiding unit, thereby the energy of the visible light portion is compressed by the first coupler.

7. The traffic signal system of claim 1, wherein the supplementary light module comprises a compound parabolic concentrator, the compound parabolic concentrator has a reflective mask and a lens, the reflective mask is disposed around the light emitting diode and the lens is disposed on the path of the second light beam.

8. The traffic signal system of claim 7, wherein the supplementary light module comprises a second light guiding unit, and the second light beam enters the second light guiding unit via the lens and is transmitted to the signal displaying module by the second light guiding unit.

9. The traffic signal system of claim 8, wherein the supplementary light module comprises a second coupler disposed between the lens and the second light guiding unit, and the energy of the second light beam emitted from the lens is compressed by the second coupler.

* * * * *